UNITED STATES PATENT OFFICE.

CARL REINHARDT, OF KAISERSLAUTERN, GERMANY.

PROCESS OF PRESERVING EGGS.

SPECIFICATION forming part of Letters Patent No. 631,997, dated August 29, 1899.

Application filed February 16, 1899. Serial No. 705,597. (No specimens.)

*To all whom it may concern:*

Be it known that I, CARL REINHARDT, a subject of the King of Prussia, German Emperor, residing at Kaiserslautern, in the Kingdom of Bavaria, German Empire, have invented a new and useful Improvement in Processes of Preserving Eggs, of which the following is a specification.

For the preservation of eggs different means and processes have hitherto been employed, which, however, do not accomplish the purpose in view in a perfect manner. Either such means and processes are in their employment rather tedious and requiring a comparatively long period of time or the eggs will become subject to the taste and smell of the preserving means—such, for instance, as water-glass or soluble glass—into which the eggs are laid or with which the eggs are painted. Sometimes the shells of the preserved eggs become tender, so as to break in boiling. Again, it is sometimes a tedious work to remove the preserving means from the shell of the eggs previous to their being used. Even the method of preserving eggs by submerging them into vitriol diluted with water (see *Webster and Parke's Encyclopedia of Domestic Economy*, 1861) is only an incomplete one, inasmuch as in closing up the pores of the egg-shell by means of the sulfate of lime generated in that process the impurities of an organic character (such as the exudates from the laying-channel of the fowls) will eventually penetrate into the interior of the egg and will cause a premature decomposition of the inner substance of the egg. I intend to remove all these defects by the means employed in my process of preserving eggs, as hereinafter described.

The new means for preserving eggs consists of an acid solution of proto-sulfate of iron containing tannin. The eggs to be preserved are exposed to the action of this solution for about five to ten minutes. By the contact of the said solution with egg-shell consisting of carbonate of lime the following reaction will take place: A minimum part in thickness of the surface of the egg's shell will be dissolved and will form by the reaction of the preserving solution an insoluble sulfate of lime. This sulfate of lime will in its production inclose the peroxid of iron formed in this process, which peroxid of iron will deposit with the sulfate of lime in the pores of the egg-shell and will close them up air-tight. The formula for this process is

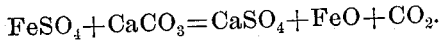

$$FeSO_4 + CaCO_3 = CaSO_4 + FeO + CO_2.$$

During this process the tannic acid, which has played no rôle or part in the process described, will penetrate into the pores of the egg-shell and will, supported by the peroxid of iron which deposits with the tannic acid simultaneously, cause the destruction or coagulation of the organic substances contained in the egg-shell pores. These organic substances are thereby rendered incapable of acting in a decomposing manner upon the inner substance of the egg.

In treating eggs in the manner specified they may be kept fresh for a longer period than hitherto attainable by other methods. The proto-sulfate of iron containing tannin I produce by using a filtered decoction of oak-bark or other tannin-containing material instead of water in the well-known production of proto-sulfate of iron.

I claim as my invention—

The herein-described process for preserving eggs, consisting in immersing them in an acid solution of proto-sulfate of iron containing tannin, substantially as specified.

In testimony that I claim the foregoing as my invention I have signed my name, in presence of two witnesses, this 28th day of January, 1899.

CARL REINHARDT.

Witnesses:
 H. GEHM,
 MICHAEL ZIMMERMANN.